United States Patent
Pacetti et al.

(10) Patent No.: US 10,158,166 B2
(45) Date of Patent: Dec. 18, 2018

(54) ECO-FRIENDLY THERMOPLASTIC CONFORMAL COATING FOR ANTENNA ARRAY SYSTEMS

(71) Applicant: LEONARDO S.p.A., Rome (IT)

(72) Inventors: Stefano Pacetti, Rome (IT); Leopoldo Infante, Rome (IT); Mario Teglia, Rome (IT); Emanuele Tiribelli, Rome (IT); Flavio Troiani, Rome (IT)

(73) Assignee: LEONARDO S.P.A., Rome (IT)

( * ) Notice: Subject to any disclaimer, the term of this patent is extended or adjusted under 35 U.S.C. 154(b) by 36 days.

(21) Appl. No.: 15/524,490

(22) PCT Filed: Nov. 6, 2014

(86) PCT No.: PCT/IT2014/000290
§ 371 (c)(1),
(2) Date: May 4, 2017

(87) PCT Pub. No.: WO2016/071932
PCT Pub. Date: May 12, 2016

(65) Prior Publication Data
US 2017/0324156 A1    Nov. 9, 2017

(51) Int. Cl.
| | |
|---|---|
| *H01Q 1/40* | (2006.01) |
| *C09D 123/00* | (2006.01) |
| *C09D 199/00* | (2006.01) |
| *H01Q 9/16* | (2006.01) |
| *C09D 123/26* | (2006.01) |

(52) U.S. Cl.
CPC ............. *H01Q 1/40* (2013.01); *C09D 123/00* (2013.01); *C09D 123/26* (2013.01); *C09D 199/00* (2013.01); *H01Q 9/16* (2013.01)

(58) Field of Classification Search
CPC .......... H01Q 1/40; H01Q 9/16; C09D 123/00; C09D 123/26; C09D 199/00
See application file for complete search history.

(56) References Cited

U.S. PATENT DOCUMENTS

| | | | |
|---|---|---|---|
| 5,285,212 A | 2/1994 | McNiece | |
| 6,285,324 B1 | 9/2001 | Korisch et al. | |
| 7,015,861 B2 * | 3/2006 | Boyd | H01Q 1/28 343/700 MS |
| 7,317,395 B2 * | 1/2008 | Ishikawa | G06K 19/07749 235/492 |

(Continued)

FOREIGN PATENT DOCUMENTS

| | | |
|---|---|---|
| EP | 0292628 A2 | 11/1988 |
| JP | 2000174532 A | 6/2000 |

(Continued)

OTHER PUBLICATIONS

International Search Report and Written Opinion received for PCT/IT2014/000290 dated Jul. 10, 2015.

*Primary Examiner* — Hoang Nguyen
(74) *Attorney, Agent, or Firm* — Dorsey & Whitney LLP (57) ABSTRACT

Disclosed herein is a method for applying a conformal coating to one or more radio frequency elements of an antenna or antenna array. Said method is characterized in that the conformal coating is based on a thermoplastic material produced from a mixture comprising a thermoplastic polymer and an olive pomace.

17 Claims, 4 Drawing Sheets

(56) References Cited

U.S. PATENT DOCUMENTS

| | | | |
|---|---|---|---|
| 2006/0232419 A1* | 10/2006 | Tomioka | G06K 19/072 |
| | | | 340/572.7 |
| 2008/0131669 A1 | 6/2008 | Michalk | |
| 2010/0084473 A1* | 4/2010 | Choi | G06K 19/02 |
| | | | 235/492 |
| 2013/0234899 A1* | 9/2013 | Pope | H01Q 1/243 |
| | | | 343/702 |

FOREIGN PATENT DOCUMENTS

| | | |
|---|---|---|
| WO | 9738834 A1 | 10/1997 |
| WO | 0214432 A1 | 2/2002 |

* cited by examiner

ECO-FRIENDLY THERMOPLASTIC CONFORMAL COATING FOR ANTENNA ARRAY SYSTEMS

CROSS-REFERENCE TO RELATED APPLICATIONS

This application is a 35 U.S.C. § 371 National Stage Application of PCT Application No. PCT/IT2014/000290, filed on Nov. 06, 2014, which is hereby incorporated by reference in its entirety and for all purposes.

TECHNICAL FIELD OF THE INVENTION

The present invention relates, in general, to manufacturing of antennas and antenna arrays, and, in particular, to a technique for protecting radio frequency (RF) antenna elements (specifically, radiating elements and, conveniently, also feeding elements thereof) from external agents (such as atmospheric agents) by applying an eco-friendly thermoplastic conformal coating.

Moreover, the present invention relates also to:
  an RF antenna element having an eco-friendly thermoplastic conformal coating; and
  an antenna or antenna array, which comprises at least an RF element having an eco-friendly thermoplastic conformal coating.

BACKGROUND ART

As is known, RF antenna elements, such as radiating elements and feeding elements thereof, of antennas and antenna arrays can be encapsulated in an encapsulation material in order to be protected from external agents (such as atmospheric agents) that, otherwise, could alter characteristics of said RF antenna elements; for example, external agents, such as moisture or rain, can alter electromagnetic characteristics of, and/or oxidize, RF antenna elements.

In particular, encapsulation techniques based on thermosetting materials are currently known and used to manufacture antennas and antenna arrays. These encapsulation techniques normally exploit an injection molding process, which generally includes:
  injecting a molten thermosetting material, such as a polyurethane-based foam, into a mold in which an RF antenna element, such as an RF printed circuit, has been previously inserted in order to be coated; and
  causing the thermosetting material to solidify, whereby the thermosetting material solidifies into a protective conformal coating shaped by the mold and encapsulating the RF antenna element.

Density and homogeneity of the thermosetting material are defined a priori on the basis of the electromagnetic characteristics of the RF antenna elements to be coated. In particular, density of the mixture injected into the mold normally is such that to enable repeatability of the process and represents, at the same time, a compromise between structural capabilities and electromagnetic performances of the encapsulated RF antenna elements.

An important parameter to be kept under control during an injection molding process is the injection pressure of the thermosetting resin into molds. In particular, this parameter can be kept under control by means of machines, such as foaming machine, which dose the materials, mixing and injecting them at a constant pressure into the molds. Many thermosetting materials commonly used for injection molding are obtained by mixing two compounds, that are injected into moulds and expand up to achieving a required density of the foam material. Foams based on polyurethane (PUR or PU) are broadly used to encapsulate RF antenna elements.

An example of use of a thermosetting material, in particular a PUR-based plastic material, to encapsulate RF antenna elements is provided in C. G. Pewsey, W. N. Klimczak, R. G. Farzin, "*An Encapsulated Dipole Shaped Beam Array for Air Traffic Control*", Antennas and Propagation Society International Symposium, Chicago, July 1992, vol. 3, pp. 1418-1421. In particular, this paper concerns an encapsulated dipole array developed for use as an aircraft beacon interrogator antenna and designed to provide a highly-shaped beam. The encapsulation process described in this paper exploits a two-part reaction injection molding technique to encapsulate stripline, dipole and balun circuits in a ⅛-inch polyurethane plastic.

A further example of use of a thermosetting material to encapsulate RF printed circuits of an antenna array is provided in U.S. Pat. No. 5,285,212 (A), which relates to a self-supporting columnar antenna array including a printed circuit board that has, on one side thereof, a plurality of etched dipoles arranged in a linear array. On an opposite side of the circuit board is an excitation network for exciting each of the dipoles. The excitation network terminates in a connector to receive a radio frequency signal. The circuit board includes a plurality of openings in the spaces between the dipoles. An injection molding process encapsulates the circuit board in a thermosetting encapsulation material, namely Mobay 726 urethane. A supporting surface perpendicular to the printed circuit board extending through the openings is formed during the injection molding process. Integral mounting supports are formed in the encapsulation material at each end of the circuit board for facilitating mounting of the columnar array to a frame.

As is broadly known, thermosetting materials, such as PUR-based materials, can withstand extremely-high temperature, namely greater than 150° C., but tend after their life cycle:
  not to be recyclable as a source for newly-made plastic; and
  to entail a difficult and expensive disposal.

Accordingly, RF antenna elements coated with thermosetting materials, such as PUR-based materials, suffer from the same disadvantages. In particular, this kind of RF antenna elements has a strong environmental impact, since, after the life cycle of these RF antenna elements, the thermosetting coating materials cannot be recycled and entail a difficult and expensive disposal.

Another aspect of thermosetting coating materials which should be carefully considered is related to painting. In fact, as is known, once an RF antenna element has been coated with a thermosetting coating material by means of an injection molding process, the resulting encapsulated RF antenna element is usually painted, not only for aesthetic reasons, but rather in order to protect it from ultraviolet (UV) rays. This painting process is generally known also as UV curing. The application of a painting for UV curing requires an accurate washing of the coated RF antenna element. In fact, specific chemicals are usually used in an injection molding process in order to facilitate, once the injection molding process has been accomplished, detachment of the coated RF antenna element from the mold. Unfortunately, these specific chemicals also prevents application of a painting for UV curing to the coated RF antenna element. Therefore, after detachment of the coated RF antenna element from the mold, an accurate washing of said coated RF antenna element is required in order to remove said specific chemicals and, thence, to enable the application of a painting for UV curing.

OBJECT AND SUMMARY OF THE INVENTION

The Applicant has carried out an in-depth study on antennas used in Secondary Surveillance Radar (SSR) systems dedicated to Air Traffic Control (ATC) in order to try to improve antennas' characteristics in terms of radiation characteristics, manufacturability, stiffness, weight, cost and environmental sustainability. During this in-depth study the Applicant has tested several plastic materials, in particular several thermosetting materials and several thermoplastic materials. Thanks to this in-depth study and this extensive testing the Applicant has succeeded in identifying a specific thermoplastic material whose use is specially advantageous to apply a conformal coating to RF antenna elements.

Therefore, a general object of the present invention is that of providing a technique for applying a conformal coating to RF antenna elements, which technique overcomes, at least in part, the above-mentioned drawbacks of the encapsulation techniques based on thermosetting materials that are currently used to manufacture antennas and antenna arrays.

Moreover, a specific object of the present invention is that of providing a specific thermoplastic material whose use is specially advantageous to apply a conformal coating to RF antenna elements.

These and other objects are achieved by the present invention in that it relates to a method for applying a thermoplastic conformal coating to one or more radio frequency elements of an antenna or antenna array, to a radio frequency antenna element protected by a thermoplastic conformal coating, and to an antenna comprising at least one radio frequency element protected by a thermoplastic conformal coating, as defined in the appended claims.

In particular, the present invention relates to a method for applying a conformal coating to one or more radio frequency elements of an antenna or antenna array, characterized in that the conformal coating is based on a thermoplastic material produced from a mixture comprising a thermoplastic polymer and an olive pomace.

Conveniently, the olive pomace comprises solid remains of olives. In particular, the olive pomace comprises dry solid remains of olives in grains and/or in powder. More conveniently, the olive pomace comprises stones of olives in grains and/or in powder. More and more conveniently, the olive pomace comprises stones of olives in grains and/or in powder, and also other olives' dry solid remains in grains and/or in powder.

Preferably, the thermoplastic polymer is a polyolefin. More preferably, the thermoplastic polymer is polyethylene or polypropylene. Alternatively, said mixture comprises both polyethylene and polypropylene.

Conveniently, said mixture comprises also one or more engineering plastics in grains and/or in pieces. More conveniently, said engineering plastics are produced from industrial waste and/or sorted waste.

Preferably, said mixture comprises also one or more pigments.

Conveniently, said mixture comprises also one or more flame retardants.

According to a first preferred embodiment of the present invention, the method includes applying a conformal coating to one or more radio frequency elements of an antenna or antenna array by:

providing plates or slabs produced from the thermoplastic material;

producing encapsulation shell halves from the plates/slabs by applying thereto a milling process, wherein the produced encapsulation shell halves form in pairs an encapsulation shell comprising an internal cavity sized and shaped to house one or more radio frequency elements; and encapsulating one or more radio frequency elements in an encapsulation shell formed by two encapsulation shell halves glued together.

Alternatively, according to a second preferred embodiment of the present invention, the method includes applying a conformal coating to one or more radio frequency elements of an antenna or antenna array by using an injection molding process.

Again alternatively, according to a third preferred embodiment of the present invention, the method includes applying a conformal coating to one or more radio frequency elements of an antenna or antenna array by:

producing encapsulation shell halves from the thermoplastic material by using an injection molding process, wherein the produced encapsulation shell halves form in pairs an encapsulation shell comprising an internal cavity sized and shaped to house one or more radio frequency elements;

assembling two encapsulation shell halves together inserting one or more radio frequency elements in the internal cavity of the encapsulation shell formed by said two encapsulation shell halves;

inserting the two encapsulation shell halves assembled together and containing the one or more radio frequency elements in a mold; and heating said mold so as to weld together the two encapsulation shell halves into one single sealed encapsulation shell encapsulating the one or more radio frequency elements.

BRIEF DESCRIPTION OF THE DRAWINGS

For a better understanding of the present invention, preferred embodiments, which are intended purely by way of non-limiting example, will now be described with reference to the attached drawings (all not to scale), wherein.

DETAILED DESCRIPTION OF PREFERRED EMBODIMENTS OF THE INVENTION

The following discussion is presented to enable a person skilled in the art to make and use the invention. Various modifications to the embodiments will be readily apparent to those skilled in the art, without departing from the scope of the present invention as claimed. Thus, the present invention is not intended to be limited to the embodiments shown and described, but is to be accorded the widest scope consistent with the principles and features disclosed herein and defined in the appended claims.

As previously explained, by carrying out an in-depth study on antennas used in SSR systems and an extensive testing of plastic materials, the Applicant has succeeded in identifying a specific thermoplastic material whose use is specially advantageous to apply a conformal coating to radio frequency (RF) antenna elements.

Therefore, a main aspect of the present invention concerns the use of a specific thermoplastic material as conformal coating material for RF antenna elements (specifically, radiating elements and, conveniently, also feeding elements thereof) of an antenna or antenna array.

In particular, said main aspect of the present invention concerns the use, as conformal coating material of RF antenna elements, of a thermoplastic material produced from a mixture comprising:
a thermoplastic polymer; and
an olive pomace or marc.

In particular, in said mixture the thermoplastic polymer has an amalgamating function, while the olive pomace acts as inert charge, i.e., as filling material.

Conveniently, the olive pomace comprises solid remains of olives after these latter have been squeezed and/or crushed. In particular, the olive pomace comprises dry solid remains of olives in grains and/or in powder. More conveniently, the olive pomace comprises stones of olives in grains and/or in powder. More and more conveniently, the olive pomace comprises stones of olives in grains and/or in powder, and also other olives' dry solid remains including skins/husks and/or pulp and/or stems of olives in grains and/or in powder.

Preferably, the thermoplastic polymer is a polyolefin. More preferably, the thermoplastic polymer is polyethylene (PE) or polypropylene (PP). Alternatively, said mixture can comprise both polyethylene (PE) and polypropylene (PP).

For example, the thermoplastic material can comprise, in weight percent, 70% of PE/PP and 30% of olive pomace.

Conveniently, in order to improve mechanical and/or thermal properties of the thermoplastic material, said mixture can comprise also one or more engineering plastics, in grains and/or in pieces/scales. More conveniently, said engineering plastics are produced from industrial waste and/or sorted waste.

Moreover, said mixture can conveniently comprise also:
one or more pigments so as to avoid later painting of RF antenna elements coated with the thermoplastic material; and/or
one or more flame retardants so as to render the thermoplastic material and, thence, also the conformal coating of RF antenna elements fireproof.

Preferably, the thermoplastic material used as conformal coating material of RF antenna elements is a material named ECOMAT produced in panels and plates by the Italian firm Ecoplan S.r.l. A method for manufacturing ECOMAT plates and panels is described in the International application WO 97/38834 A1. In particular, ECOMAT plates and panels are manufactured with different sizes and thicknesses by an extrusion of a mixture comprising polyethylene (PE) and/or polypropylene (PP), engineering plastics (in grains and/or in pieces/scales) produced from industrial waste and/or sorted waste, and an olive pomace comprising stones of olives in grains and/or in powder. Until now ECOMAT plates and panels have been used exclusively for roofing, flooring, making formworks and making stiff structures intended for construction purposes.

Another aspect of the present invention relates to a method for applying to one or more RF antenna elements a conformal coating based on the aforesaid thermoplastic material.

In particular, a first encapsulation process for applying a conformal coating to RF antenna elements according to a first preferred embodiment of the present invention includes:
providing plates or slabs produced from the thermoplastic material according to the main aspect of the present invention and having predefined size, thickness and shape (for example, ECOMAT plates/slabs can be used);
producing encapsulation shell halves from the plates/slabs by applying thereto a milling process (for example by means of a milling machine or a machining center); wherein the produced encapsulation shell halves form in pairs an encapsulation shell comprising an internal cavity sized and shaped to house one or more RF antenna elements, such as one or more radiating elements and, conveniently, also feeding elements thereof (for example, an internal cavity sized and shaped to house RF printed circuitry); and
encapsulating one or more RF antenna elements in an encapsulation shell formed by two encapsulation shell halves glued together.

Figure 1:
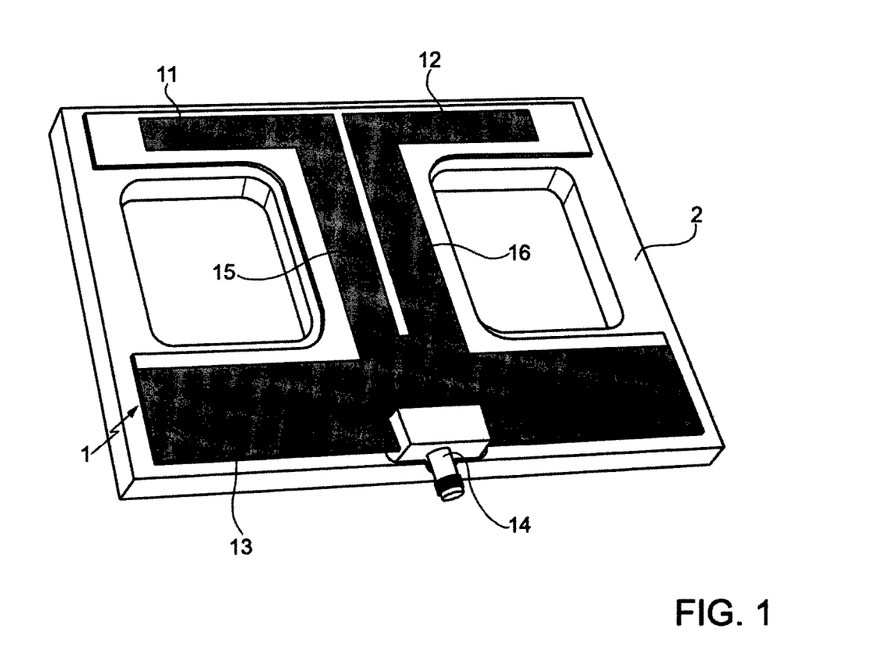
FIGS. 1-3 illustrate an example of encapsulation of a dipole antenna in an encapsulation shell produced according to a first preferred embodiment of the present invention.
Figure 2:
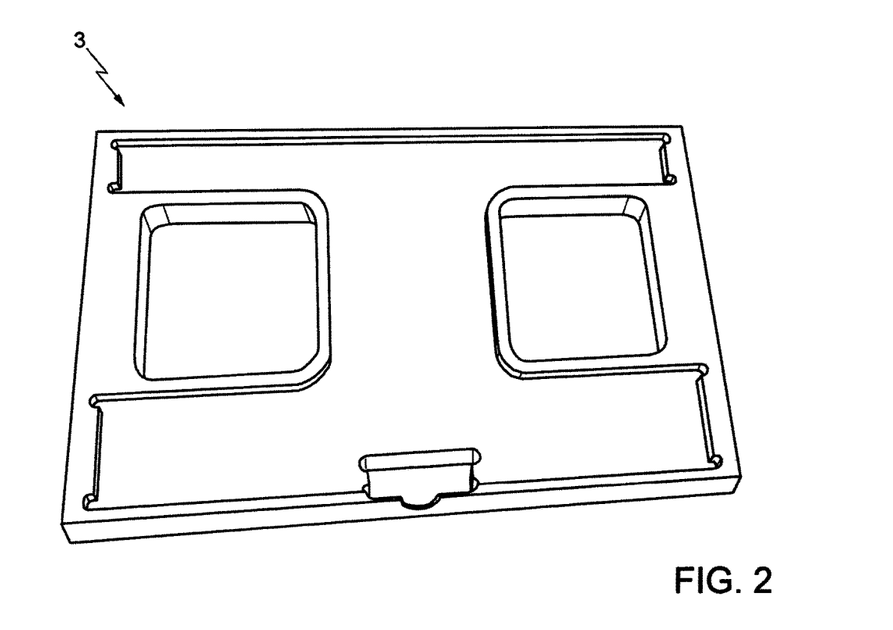
Figure 3:
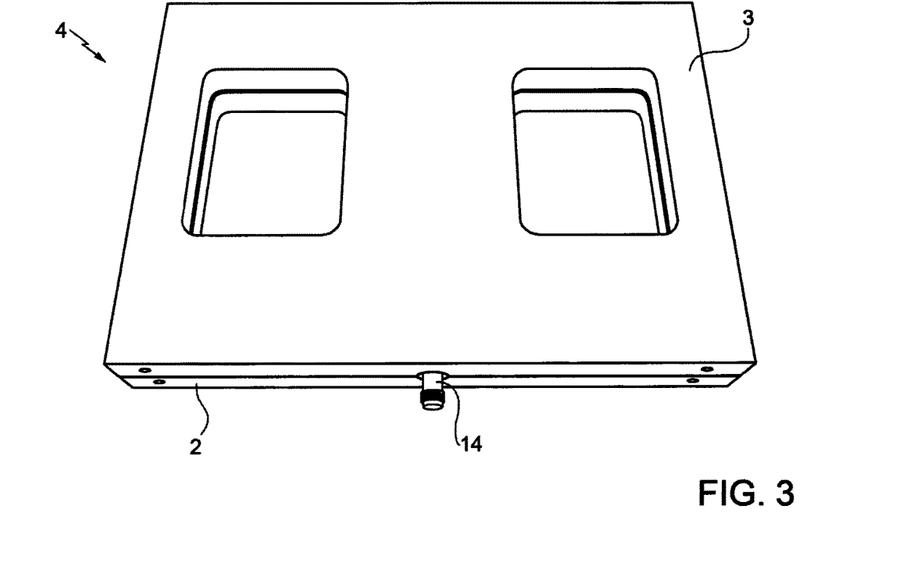

In this respect, FIGS. 1-3 illustrate an example of encapsulation of a dipole antenna in an encapsulation shell produced from ECOMAT plates/slabs.

In particular, FIG. 1 shows a printed dipole antenna 1, which:
comprises
two dipole arms 11 and 12,
a first feeding line 13 that is parallel to the dipole arms 11 and 12, and includes a coaxial cable connector 14, and
two second feeding lines 15 and 16 perpendicular to the dipole arms 11 and 12 and the first feeding line 13, each feeding line 15/16 extending between a respective dipole arm 11/12 and said first feeding line 13; and
is arranged on a first encapsulation shell half 2 produced from an ECOMAT slab by means of a milling process.

Moreover, FIGS. 2 and 3 respectively show:
a second encapsulation shell half 3 produced from an ECOMAT slab by means of a milling process, and sized and shaped correspondingly to the first encapsulation shell half 2; and
an encapsulation shell 4, which is formed by the two encapsulation shell halves 2 and 3 glued together, and encapsulates the printed dipole antenna 1, wherein only the coaxial cable connector 14 is left outside said encapsulation shell 4.

Instead, a second encapsulation process for applying a conformal coating to RF antenna elements according to a second preferred embodiment of the present invention is based on injection molding and is substantially equivalent to encapsulation processes based on thermosetting materials and injection molding that are currently used to manufacture antennas and antenna arrays (such as the ones previously described). For this reason, said second encapsulation process will be not described in detail.

Moreover, a third encapsulation process according to a third preferred embodiment of the present invention is a sort of combination of the first and second encapsulation processes. In particular, said third encapsulation process includes:

producing the encapsulation shell halves from the thermoplastic material according to the main aspect of the present invention by means of an injection molding process;

assembling two encapsulation shell halves together inserting one or more RF antenna elements (such as RF printed circuitry) in the internal cavity of the encapsulation shell formed by said two encapsulation shell halves;

inserting the two encapsulation shell halves assembled together and containing the one or more RF antenna elements in a (further) mold; and heating said (further) mold so as to weld together the two encapsulation shell halves into one single sealed encapsulation shell encapsulating the one or more RF antenna elements.

As for the second and third encapsulation processes, if size of the RF antenna elements to be encapsulated is large (i.e., greater than one meter), during injection molding it is convenient to heat the molds to avoid presence of air bubbles in the thermoplastic material and, at the same time, to facilitate detachment of the thermoplastic material from the mold.

With low volumes of production the first encapsulation process is more advantageous than the second and third encapsulation processes, while with higher and higher volumes of production also the second and third encapsulation processes become more and more advantageous.

Further aspects of the present invention relates to:

an RF antenna element protected by a conformal coating produced from the thermoplastic material according to the main aspect of the present invention (conveniently by means of the first or second or third encapsulation process); and an antenna or antenna array comprising said RF antenna element.

As previously explained, the Applicant is arrived at the present invention by testing several thermosetting materials and several thermoplastic materials suitable for conformal coating of RF antenna elements arranged in linear arrays, specifically the ones used in SSR systems dedicated to ATC.

In particular, the Applicant has deeply and extensively tested mechanical and electromagnetic characteristics of several thermosetting and thermoplastic materials in order to identify materials meeting predefined requirements including:

mechanical requirements (specifically, in terms of mechanical stiffness and resilience to atmospheric agents) related to the specific application considered (namely, antenna arrays of SSR systems, that, as is known, can be exposed to extreme atmospheric conditions); and electromagnetic requirements in terms of electromagnetic transparency to radio signals considered.

In detail, the Applicant has determined typical electromagnetic parameters, such as the dielectric constant and the dissipation factor, of several thermosetting and thermoplastic materials, trying to obtain a right balance between mechanical stiffness and electromagnetic performances.

At last, the Applicant has identified the thermoplastic material according to the main aspect of the present invention as the material ensuring excellent mechanical performances in terms of mechanical stiffness and resilience to atmospheric agents and also excellent electromagnetic performances.

Figure 4:
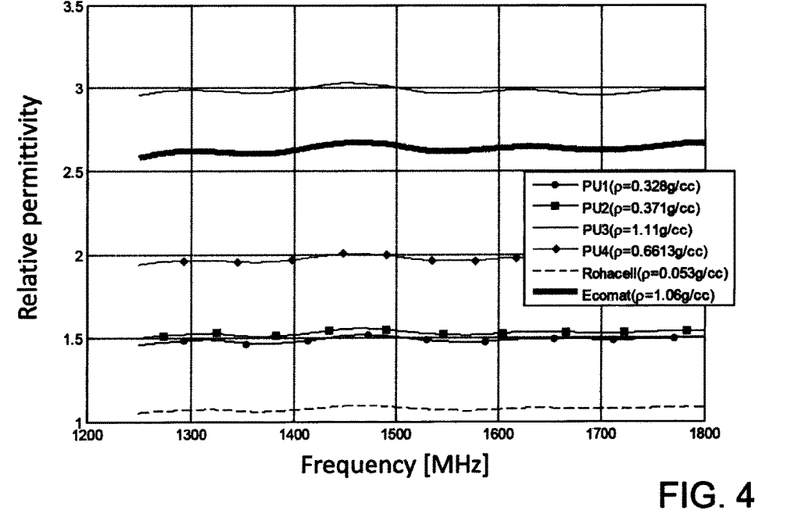
FIGS. 4 and 5 show, respectively, relative permittivity and dissipation factor of a thermoplastic material named ECOMAT and of several PUR-based resins as a function of frequency.
Figure 5:
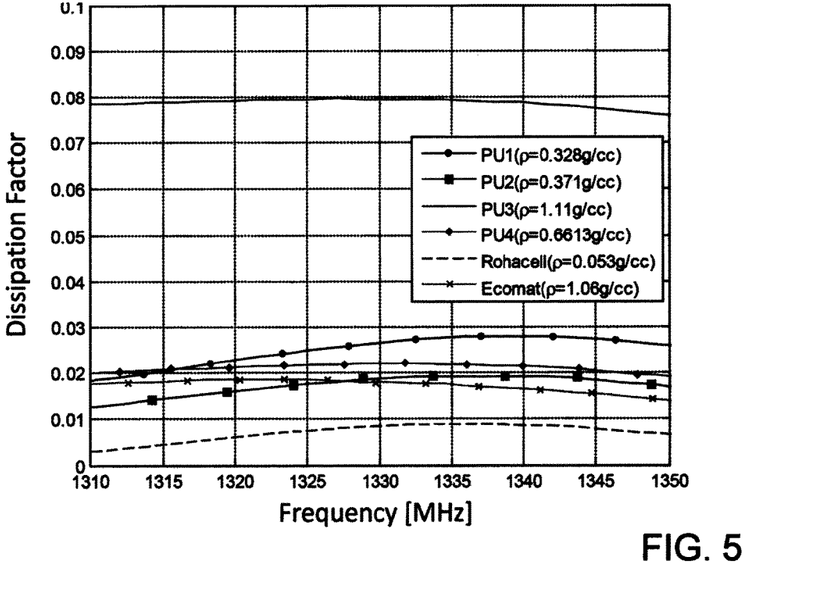

In this respect, FIGS. 4 and 5 show, respectively, relative permittivity (or dielectric constant) $\varepsilon_r$ and dissipation factor of the ECOMAT and of PUR-based resins having different densities (in fact, the ECOMAT is manufactured with a fixed density equal to about 1100 kg/m³, while density of PUR-based resins can be modulated up to 900 kg/m³) as a function of the frequency.

Figure 6:
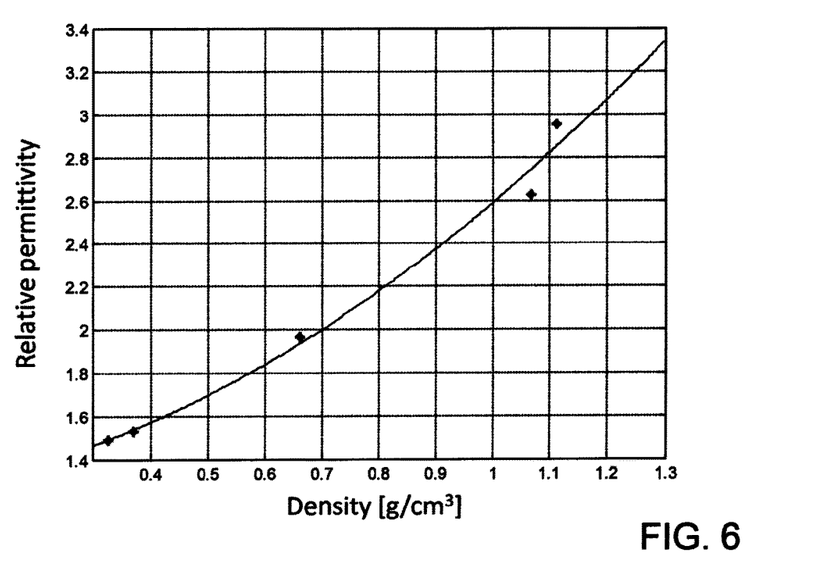
FIGS. 6 and 7 show final calibration curves, respectively, of the relative permittivity and of the dissipation factor as a function of material's density for both ECOMAT and PUR-based resins.
Figure 7:
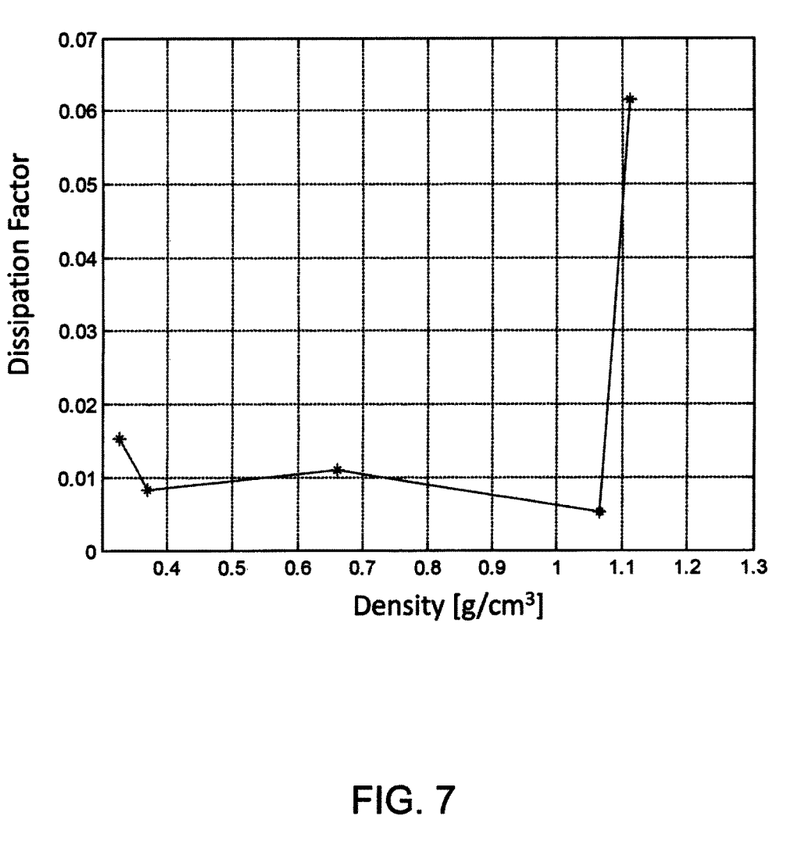

Moreover, the Applicant has obtained:

a final calibration curve of the relative permittivity $\varepsilon_r$ as a function of the material's density for both ECOMAT and PUR-based materials, which is shown in FIG. 6; and a final calibration curve of the dissipation factor as a function of the material's density for both ECOMAT and PUR-based materials, which is shown in FIG. 7.

As it can be inferred from FIG. 4-7, the electromagnetic performances of the ECOMAT are better than PUR-based resins in terms of dissipation factor, thereby proving itself to be a dielectric material with low RF losses that is particularly advantageous as conformal coating material for RF antenna elements.

Moreover, it is worth noting that, in general, the thermoplastic material according to the main aspect of the present invention and, in particular, the ECOMAT provide the same consistency and malleability as traditional thermosetting materials, thereby ensuring a complete coating of the RF antenna elements.

In this way it is possible to obtain antenna devices having the same radiating properties as those encapsulated in injection-molded thermoplastic materials, with some further advantages: greater resilience to atmospheric agents, considerable reduction in production costs and in the total weight of the antenna, and a lower environmental impact due to the use of recyclable/recycled thermoplastic polymers, such as polypropylene and polyethylene, and of materials recycled from industrial waste, in particular olive pomace and, conveniently, also engineering plastics produced from industrial waste and/or sorted waste.

In particular, the conformal coating based on the thermoplastic material according to the main aspect of the present invention has excellent characteristics in terms of stiffness and weatherproofing, is customizable in terms of shape, and is lightweight, low-cost and eco-friendly.

Further important advantages of the thermoplastic material according to the main aspect of the present invention with respect to thermosetting materials are discussed in the following.

Thermosetting materials, such as PUR-based materials, have a strong environmental impact; they can withstand extremely-high temperature, i.e., greater than 150° C., and cannot be recycled after the life cycle of the antenna.

On the contrary, the thermoplastic material according to the main aspect of the present invention is stable for temperatures up to 90° C., thereby being compatible with the outdoor maximum temperature of 71° C. Moreover, the thermoplastic material according to the main aspect of the present invention can be recycled.

Additionally, as previously explained, the application of a painting for UV curing requires an accurate washing of the RF antenna elements coated with injection-molded thermosetting materials, such as injection-molded PUR-based materials.

On the contrary, the present invention avoids both washing and painting steps since one or more pigments can be added directly to the mixture from which the thermoplastic coating material is produced, thereby rendering these two steps unneeded. In this way manufacturing process becomes shorter and an harmful activity, namely the painting process, is avoided. Moreover, the UV resistance of the PP/PE-based thermoplastic coating material according to the main aspect of the present invention is greater than PUR-based materials.

The present invention can be advantageously exploited with antenna systems operating under extreme atmospheric conditions, such as ATC systems or, more in general, radar systems. The Applicant has conceived the present invention for antennas operating in UHF band (300 MHz-1 GHz) and L band (1 GHz-2 GHz). However, it is worth noting that the present invention can be advantageously exploited also in other frequency bands by keeping under control composition and density of the thermoplastic material used for the conformal coating. In particular, the present invention can be advantageously exploited not only with ATC and radar systems, but also with antennas of telecommunications devices and systems.

The present invention can be advantageously used to manufacture new antennas and antenna arrays and also to replace thermosetting conformal coatings of RF antenna elements of existing antenna systems, with applications in land, naval and avionics sectors.

Finally, it is clear that numerous modifications and variants can be made to the present invention, all falling within the scope of the invention, as defined in the appended claims.

The invention claimed is:

1. Method for applying a conformal coating to one or more radio frequency elements of an antenna or antenna array, wherein the conformal coating is based on a thermoplastic material produced from a mixture comprising a thermoplastic polymer and an olive pomace.

2. The method of claim 1, wherein the olive pomace comprises solid remains of olives.

3. The method according to claim 1, wherein the olive pomace comprises dry solid remains of olives in grains and/or in powder.

4. The method according to claim 1, wherein the olive pomace comprises stones of olives in grains and/or in powder.

5. The method according to claim 1, wherein the olive pomace comprises stones of olives in grains and/or in powder, and also other olives' dry solid remains in grains and/or in powder.

6. The method according to claim 1, wherein the thermoplastic polymer is a polyolefin.

7. The method according to claim 1, wherein the thermoplastic polymer is polyethylene or polypropylene.

8. The method according to claim 1, wherein said mixture comprises both polyethylene and polypropylene.

9. The method according to claim 1, wherein said mixture comprises also one or more engineering plastics in grains and/or in pieces.

10. The method of claim 9, wherein said engineering plastics are produced from industrial waste and/or sorted waste.

11. The method according to claim 1, wherein said mixture comprises also one or more pigments.

12. The method according to claim 1, wherein said mixture comprises also one or more flame retardants.

13. The method according to claim 1, including applying a conformal coating to one or more radio frequency elements of an antenna or antenna array by:
    providing plates or slabs produced from the thermoplastic material;
    producing encapsulation shell halves from the plates/slabs by applying thereto a milling process, wherein the produced encapsulation shell halves form in pairs an encapsulation shell comprising an internal cavity sized and shaped to house one or more radio frequency elements; and
    encapsulating one or more radio frequency elements in an encapsulation shell formed by two encapsulation shell halves glued together.

14. The method according to claim 1, including applying a conformal coating to one or more radio frequency elements of an antenna or antenna array by using an injection molding process.

15. The method according to claim 1, including applying a conformal coating to one or more radio frequency elements of an antenna or antenna array by:
    producing encapsulation shell halves from the thermoplastic material by using an injection molding process, wherein the produced encapsulation shell halves form in pairs an encapsulation shell comprising an internal cavity sized and shaped to house one or more radio frequency elements;
    assembling two encapsulation shell halves together inserting one or more radio frequency elements in the internal cavity of the encapsulation shell formed by said two encapsulation shell halves;
    inserting the two encapsulation shell halves assembled together and containing the one or more radio frequency elements in a mold; and
    heating said mold so as to weld together the two encapsulation shell halves into one single sealed encapsulation shell encapsulating the one or more radio frequency elements.

16. Radio frequency element for an antenna or antenna array, said radio frequency element being protected by a conformal coating applied to said radio frequency element using the method claimed in claim 1.

17. An antenna comprising the radio frequency element claimed in claim 16.

* * * * *